(12) United States Patent
Amutham

(10) Patent No.: US 8,255,574 B2
(45) Date of Patent: Aug. 28, 2012

(54) SYSTEM FOR LOCATING COMPUTING DEVICES

(75) Inventor: Velayutham Kadal Amutham, Chennai (IN)

(73) Assignee: Empire Technology Development LLC, Wilmington, DE (US)

( * ) Notice: Subject to any disclaimer, the term of this patent is extended or adjusted under 35 U.S.C. 154(b) by 61 days.

(21) Appl. No.: 12/550,697

(22) Filed: Aug. 31, 2009

(65) Prior Publication Data

US 2010/0299416 A1 Nov. 25, 2010

(30) Foreign Application Priority Data

May 20, 2009 (IN) .......................... 1157/CHE/2009

(51) Int. Cl.
*G06F 15/16* (2006.01)
(52) U.S. Cl. ........ 709/250; 709/202; 709/223; 709/245; 370/253; 370/401
(58) Field of Classification Search .......... 709/202–203, 709/217–218, 223, 238–239, 245–246, 249–250; 370/253–254, 331, 400–401
See application file for complete search history.

(56) References Cited

U.S. PATENT DOCUMENTS

| | | | |
|---|---|---|---|
| 6,205,483 B1 * | 3/2001 | Nakanishi | 709/250 |
| 6,366,957 B1 * | 4/2002 | Na | 709/229 |
| 6,865,613 B1 * | 3/2005 | Millet et al. | 709/245 |
| 6,956,828 B2 * | 10/2005 | Simard et al. | 370/401 |
| 7,925,780 B2 * | 4/2011 | Philyaw | 709/250 |
| 2005/0265331 A1 | 12/2005 | Stolfo | |
| 2006/0184658 A1 | 8/2006 | Riddell | |
| 2006/0268902 A1 | 11/2006 | Bonner | |
| 2007/0041355 A1 | 2/2007 | Shaw | |
| 2008/0080503 A1 * | 4/2008 | Shvodian et al. | 370/401 |
| 2009/0323632 A1 * | 12/2009 | Nix | 370/331 |

* cited by examiner

*Primary Examiner* — Bharat N Barot
(74) *Attorney, Agent, or Firm* — Brundidge & Stanger, P.C.

(57) ABSTRACT

Provided embodiments include a device, a system, an article of manufacture, and a method. A system is provided. The system includes a transmit module, an interface module, and a control module. The transmit module receives first data for transmitting the first data over a network. The interface module interfaces the transmit module to the network. The interface module has a network address that identifies the interface module on the network. The control module receives a control signal to transmit the first data over the network. The control module outputs the network address to the transmit module when the control signal is received. The transmit module transmits the first data that includes the network address over the network.

20 Claims, 4 Drawing Sheets

SYSTEM FOR LOCATING COMPUTING DEVICES

CROSS-REFERENCE TO RELATED APPLICATIONS

This application claims the benefit and priority of India Application Serial No. 1157/CHE/2009, filed May 20, 2009. The entire disclosure of the above application is incorporated herein by reference.

BACKGROUND

Computing devices including personal computers (PCs), laptop computers (laptops), cellular phones, and personal digital assistants (PDAs) that allow access to the Internet are becoming increasingly affordable and popular. Consequently, use of the Internet and Internet-based services including electronic mail (e-mail) and electronic commerce (e-commerce) is proliferating.

Internet users frequently experience problems that include spam, viruses, fraud, and hacking. Some jurisdictions have laws that forbid gambling, hosting offensive content, and infringing copyrights and trademarks on the Internet. Tracking or locating the computing devices where these problems originate is often difficult.

Data transmitted on the Internet typically includes some identifying information that can be used to track the computing device that transmitted the data. For example, an e-mail includes a header that identifies at least an identity of a sender of the e-mail and Internet Protocol (IP) addresses of sending and receiving mail servers. The identity of the sender, however, can be changed or hidden. Additionally, the IP addresses of the mail servers may not always be permanent. For example, some public computers may be assigned dynamic IP addresses, while most home computers may have static IP addresses. Consequently, tracking spam and viruses originating from most public and home computers can be difficult.

Figure 1:
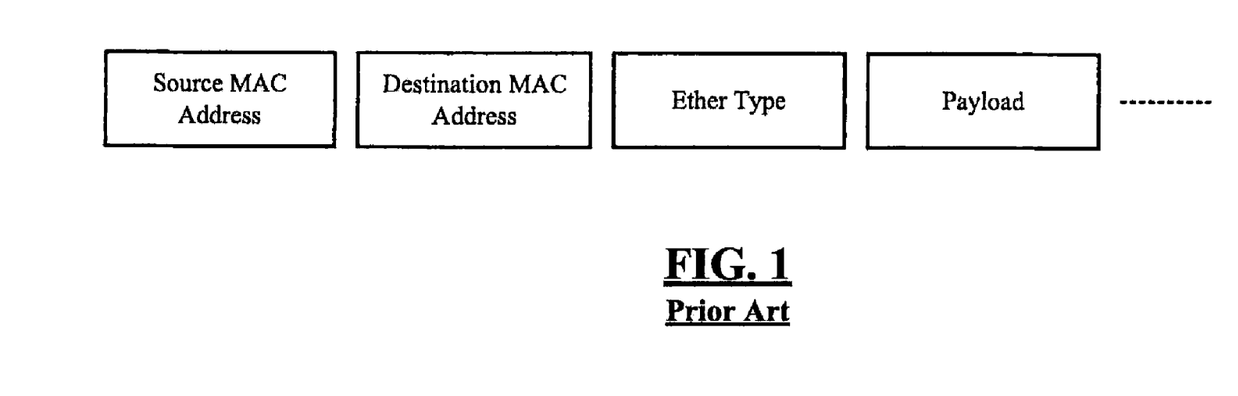
FIG. 1 is a schematic representation of an example of a typical Ethernet frame.

Referring now to FIG. 1, an example of a transmission control protocol/Internet protocol (TCP/IP) frame is shown. As shown, a TCP/IP frame includes source and destination medium access controller (MAC) address fields, an ether type field, and a payload (data) field. A user of a transmitting device may modify the source MAC address to change or hide the identity of the user.

SUMMARY

An embodiment of the subject matter described herein provides a system for tracking computing devices. The system comprises a transmit module, an interface module, and a control module. The transmit module receives first data for transmitting the first data over a network. The interface module interfaces the transmit module to the network. The interface module has a network address that identifies the interface module on the network. The control module receives a control signal to transmit the first data over the network. The control module outputs the network address to the transmit module when the control signal is received. The transmit module transmits the first data that includes the network address over the network.

The first data includes at least one of an electronic mail, a web page, and a file that is uploaded to the network using file transfer protocol (FTP). The network includes the Internet. When the interface module comprises one of a wireline Ethernet interface and a wireless Ethernet interface, the network address includes an Ethernet address of the one of the wireline Ethernet interface and the wireless Ethernet interface. The control signal includes a transmit command to transmit the first data.

The system further comprises a receive module and a verification module. The receive module receives second data from a remote computing device via the network. The second data includes at least one of an electronic mail transmitted by the remote computing device, a web page hosted by the remote computing device, and a file uploaded by the remote computing device using a file transfer protocol (FTP). The verification module verifies whether the second data includes at least one of the network address and another network address that identifies the remote computing device on the network. When the second data includes the other network address, the verification module determines based on the other network address that the remote computing device transmitted the second data. The verification module discards the second data when the second data does not include at least one of the network address and the other network address.

Another embodiment of the subject matter described herein provides a method for tracking computing devices. The method comprises transmitting over a network via a transmit module and interfacing the transmit module to the network using an interface module having a network address that identifies the interface module on the network. The method further comprises receiving first data for transmitting the first data over the network and receiving a control signal to transmit the first data over the network. The method further comprises including the network address in the first data when the control signal is received and transmitting the first data that includes the network address over the network. The method further comprises transmitting as the first data at least one of an electronic mail, a web page, and a file that is uploaded to the network using file transfer protocol (FTP).

The method further comprises receiving second data from a remote computing device via the network. The method further comprises receiving as the second data at least one of an electronic mail transmitted by the remote computing device, a web page hosted by the remote computing device, and a file uploaded by the remote computing device using a file transfer protocol (FTP). The method further comprises verifying whether the second data includes at least one of the network address and another network address that identifies the remote computing device on the network. The method further comprises determining that the remote computing device transmitted the second data when the second data includes the other network address. The method further comprises discarding the second data when the second data does not include at least one of the network address and the other network address.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Most computing devices use a network interface card (NIC) having a unique Ethernet address or a MAC address. Some computing devices such as desktop and laptop computers may include a motherboard that has the NIC built-in. The Ethernet address of the NIC is typically embedded in the NIC when the NIC is manufactured and cannot be altered thereafter. Additionally, the Ethernet address can be accessed only by an operating system (OS) of the computing device and cannot be altered by the user of the computing device.

Figure 2:
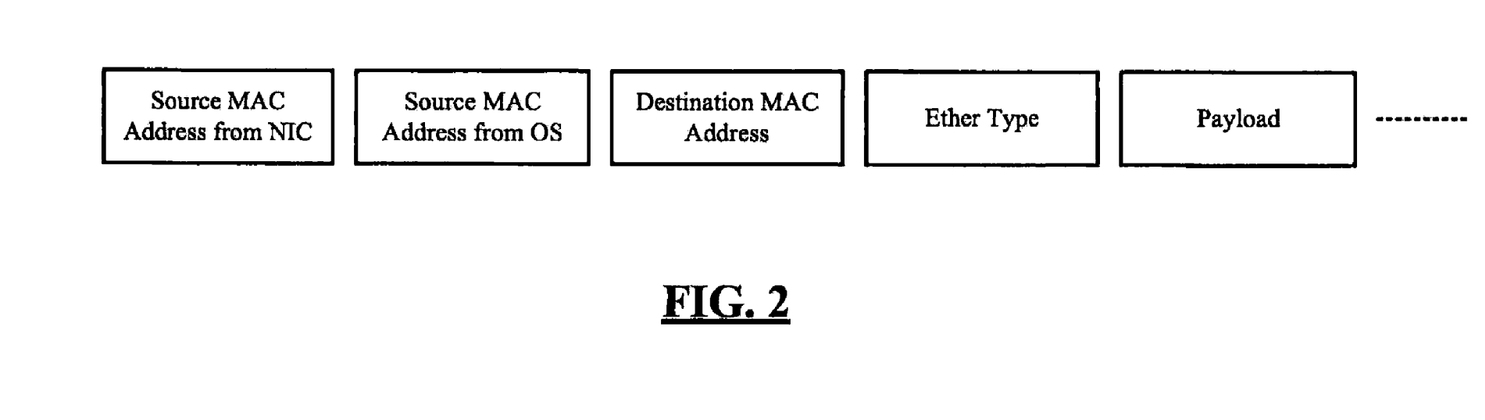
FIG. 2 is a schematic representation of an example of an Ethernet frame that includes an additional unique identifier according to an embodiment of the present disclosure.

Referring now to FIG. 2, an embodiment of the present disclosure relates to adding a unique identifier to data transmitted on the Internet by the computing device after a user of the computing device issues a transmit command. In FIG. 2, an example of a TCP/IP frame according to an embodiment of the present disclosure is shown. The TCP/IP frame shown includes source and destination medium access controller (MAC) address fields, an ether type field, a payload (data) field, and an additional source MAC address of the NIC. Normally, when the source MAC address from the OS is unaltered, the source MAC address from the NIC matches the source MAC address from the OS. Conversely, when the source MAC address from the OS is maliciously altered by a sender or user of a transmitting device, the source MAC address from the NIC does not match the source MAC address from the OS. Yet the identity of the sender or the transmitting device can be determined based on the source MAC address from the NIC.

Referring generally to FIGS. 2-6, the Ethernet address of the NIC may be added as the unique identifier to the data transmitted by the computing device so that the computing device can be identified as a sending device that sends the data. In an embodiment according to the present disclosure, the Ethernet address may be added only after the user issues a transmit command. For example, the Ethernet address may be added only after the user enters a key on a keypad of the computing device or clicks on a send or similar button on a screen of the computing device to issue the transmit command.

NICs can transmit data on the Internet in the form of packets or frames. The packets are preceded by headers. The headers can include addresses of sender and receiver, the transmitted data, and an error correcting code (ECC) (e.g., a checksum). The NIC may add the Ethernet address of the NIC to the headers. When a receiving computing device (receiver) receives the data, the receiver can identify the sending device that transmitted the data based on the Ethernet address of the NIC of the sending device present in the received data.

Following are some examples where the Ethernet address may be added after the computing device receives a request to transmit data and before the computing device transmits the data. The Ethernet address may be added to the header of the e-mail after the user sending the e-mail issues a transmit command. The Ethernet address may be added when the computing device transmits a web page hosted by the computing device. Thus, the computing device that hosts the web page may be identified.

Other examples where the Ethernet address may be added include files transferred by the computing device using file transfer protocol (FTP). The file transfers may include uploads and downloads. Thus, the computing device that uploads and downloads the files may be tracked.

Furthermore, problems may be prevented from occurring at the receiver that receives information via the Internet. The receiver may process data received via the Internet and accept the data only when the data includes the unique identifier. The receiving computing device may reject any data without the unique identifier. Thus, problems including spam and viruses may be prevented.

Figure 6:
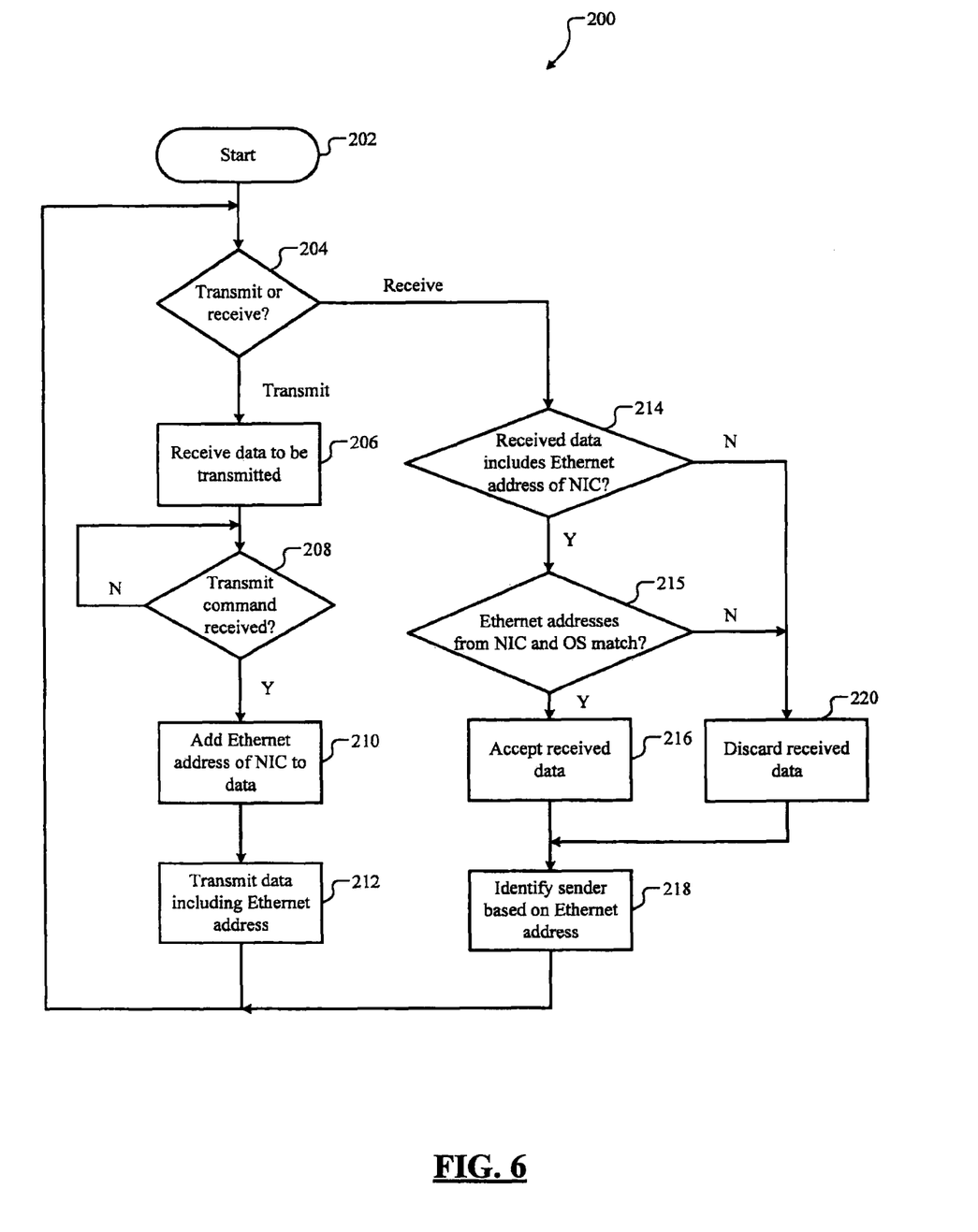
FIG. 6 is a flowchart of an example of a method for tracking sources of data transmitted over the Internet.

Alternatively or additionally, as shown in FIG. 6, the receiving computing device may compare the source MAC address from the NIC to the source MAC address from the OS. The receiving computing device may reject the frame of data received when the source MAC address from the NIC does not match the source MAC address from the OS.

E-mail clients (i.e., front-ends that manage e-mail), hosting programs, FTP programs, etc. may be designed to automatically add Ethernet addresses to the data being transmitted after the transmit command is issued. E-mail servers may reject e-mails received without Ethernet addresses. Web pages received without Ethernet addresses may be rejected. Files transferred using FTP without Ethernet addresses may be rejected. Accordingly, problems including spam, viruses, fraud, hacking, and hosting and receiving offensive content may be tracked and reduced using the Ethernet addresses.

Although the Ethernet address is used as a non-limiting example throughout the disclosure, many other unique identifiers may be used instead of or in addition to the Ethernet address. The other unique identifiers may be stored in computing devices such that users cannot alter the stored unique identifiers. The stored unique identifiers can bee added to the data after the user issues transmit commands. Examples of the other unique identifiers may include any identifying information of the computing device and/or of the user of the computing device. For example, the identifying information may include name, social security number, driver's license number, and/or phone number of the user. Additionally or alternatively, the identifying information may include a unique serial number assigned to the computing device by a manufacturer.

When computing devices are resold, a reseller may update the identifying information using the identifying information of a new buyer. Since Internet communications by the computing device may now include the identifying information of the new buyer, any problematic communications by the computing device may be traced back to the new buyer.

Figure 3:
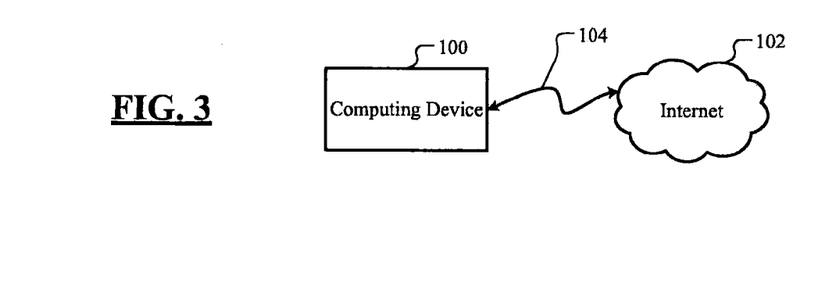
FIG. 3 is a schematic representation of an example of a computing device that communicates with the Internet.
Figure 4:
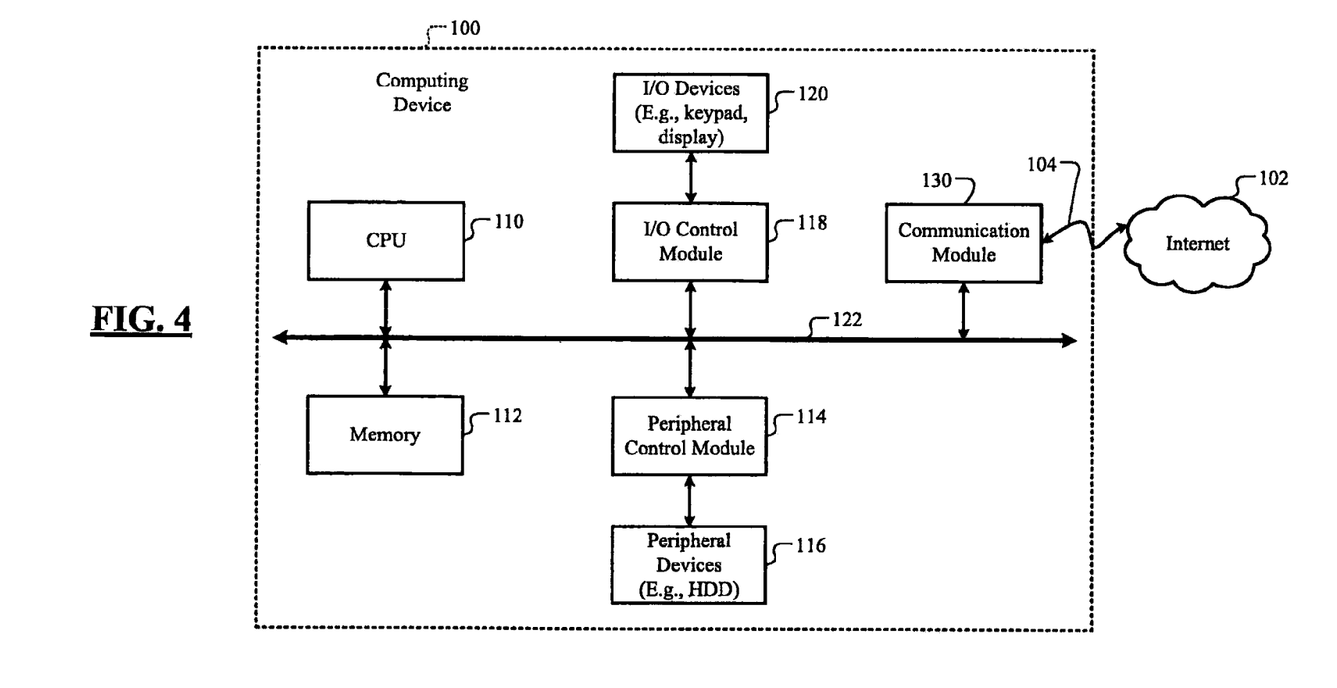
FIG. 4 is a functional block diagram of an example of a computing device.

Referring now to FIGS. 3 and 4, a computing device 100 communicates with the Internet 102. The computing device 100 may include a personal computer (PC), a laptop computer (laptop), a mobile computing device, or a mobile internet device (MID). The mobile computing device may include a cellular phone, a personal digital assistant (PDA), and a digital camera. The computing device 100 may communicate with the Internet 102 via a link 104. The link 104 may be wired or wireless.

In FIG. 4, a schematic of an example of the computing device 100 is shown. Only core components relevant to understanding and using the present are shown. It is understood that depending on configuration, the computing device 100 may include additional components not shown. An example of an embodiment of the computing device 100 may comprise a central processing unit (CPU) 110, memory 112, a peripheral control module 114, peripheral devices 116, an input/output (I/O) control module 118, I/O devices 120, and a communication module 130. The CPU 110, memory 112, and other modules of the computing device 100 communicate via a bus 122.

The CPU 110 runs an operating system (OS) and application programs of the computing device 100. The CPU 110 processes data that is transmitted and received by the computing device 100 via the Internet 102. Memory 112 stores data processed by the CPU 110 and by the other modules of the computing device 100.

The peripheral control module 114 controls the peripheral devices 116 of the computing device 100. The peripheral devices 116 may include one or more hard disk drives (HDDs), compact disc (CD) drives, and/or digital versatile disc (DVD) drives. The peripheral devices 116 store the OS and the application programs executed by the CPU 110.

The I/O control module 118 controls the I/O devices 120 of the computing device. The I/O devices 120 may include a keypad, a display, and/or a pointing device. The pointing device may include a mouse and/or a touchpad. Additionally or alternatively, the computing device 100 may include a voice recognition system. The user may interact with the computing device 100 using the voice recognition system. For example, the user may input voice commands via the voice recognition system.

The communication module 130 can communicate with the Internet 102. The communication module 130 can transmit data to Internet 102 and receive data from the Internet 102. In an example of the embodiment, the communication module 130 can include a NIC or an interface module having a unique Ethernet address that identifies the communication module 130. In other words, the communication module 130 has the unique Ethernet address. The unique Ethernet address may be embedded in the communication module 130 during manufacture. For example, the unique Ethernet address may be embedded in the NIC during a programming step of manufacture of the NIC. Once embedded during manufacturing, a user of the computing device 100 cannot alter the unique Ethernet address.

The communication module 130 can receive data to be transmitted from the bus 122. Additionally, the communication module 130 can receive a transmit command from the bus 122 to transmit the data. The data may be output to the communication module 130 by the CPU 110, memory 112, the peripheral control module 114, and/or the I/O control module 118. The transmit command may be issued by the CPU 110 or by a user via the I/O devices 120. For example, the application programs executed by the CPU 110 may generate the data and the transmit command. Alternatively or additionally, the user may generate the transmit command by pressing a key on the keypad, by clicking a send or similar button on the display, or by speaking into a microphone of the voice recognition system. Generally, the transmit command may be in the form of a control signal generated by any of the modules of the computing device 100 or by any of the application programs running on the computing device 100.

The communication module 130 generates packets of the data and generates headers that precede the packets. The communication module 130 adds the Ethernet address to the headers after receiving the transmit command. More specifically, after receiving the transmit command, the communication module 130 retrieves the unique Ethernet address embedded in the NIC. Thereafter, the communication module 130 inserts the unique Ethernet address in one of the headers. The retrieval and insertion of the unique Ethernet address occurs without any alteration of the unique Ethernet address. In other words, the software running on the computing device 100 lacks the ability to alter the unique Ethernet address. Consequently, the user of the computing device 100 cannot alter the unique Ethernet address before or after the unique Ethernet address is inserted into one of the headers. Thus, when the communication module 130 transmits the packets to the Internet 102, the unique Ethernet address inserted in the headers is automatically transmitted with the headers that precede the packets.

An example of a frame of data transmitted according to the embodiment is shown in FIG. 2. As shown, the unique Ethernet address (i.e., the source MAC address from the NIC) is added to the frame. The source MAC address from the NIC is included in the frame in addition to the source MAC address from the OS. Generally, absent any malicious alteration of the source MAC address from the OS, the source MAC address from the NIC matches the source MAC address from the OS.

When the communication module 130 receives data from the Internet 102, the communication module 130 verifies if the received data includes an Ethernet address of the sending device and/or the Ethernet address of the communication module 130. For example, the communication module 130 processes the header portions of the received data. The communication module 130 detects whether the header portions include the Ethernet address of the sending device and/or the Ethernet address of the communication module 130. For example, the communication module 130 detects whether the header portions include the unique Ethernet address or the MAC address of the NIC.

Based on the processing of the header portions of the received data, the communication module 130 determines whether to accept or discard the received data. The communication module 130 accepts and outputs the received data to the bus 122 when the received data includes the Ethernet address of the sending device and/or the Ethernet address of the communication module 130. Conversely, the communication module 130 discards the received data when the received data does not include the Ethernet address of the sending device and/or the Ethernet address of the communication module 130.

Alternatively or additionally, the communication module 130 may accept the received data when the source MAC address from the NIC matches the source MAC address from the OS. Conversely, the communication module 130 may discard the received data when the source MAC address from the NIC does not match the source MAC address from the OS. Further, when the source MAC address from the NIC does not match the source MAC address from the OS, the communication module 130 can identify the source (i.e., sender or transmitter) of the received data based on the source MAC address from the NIC included in the received data.

Figure 5:
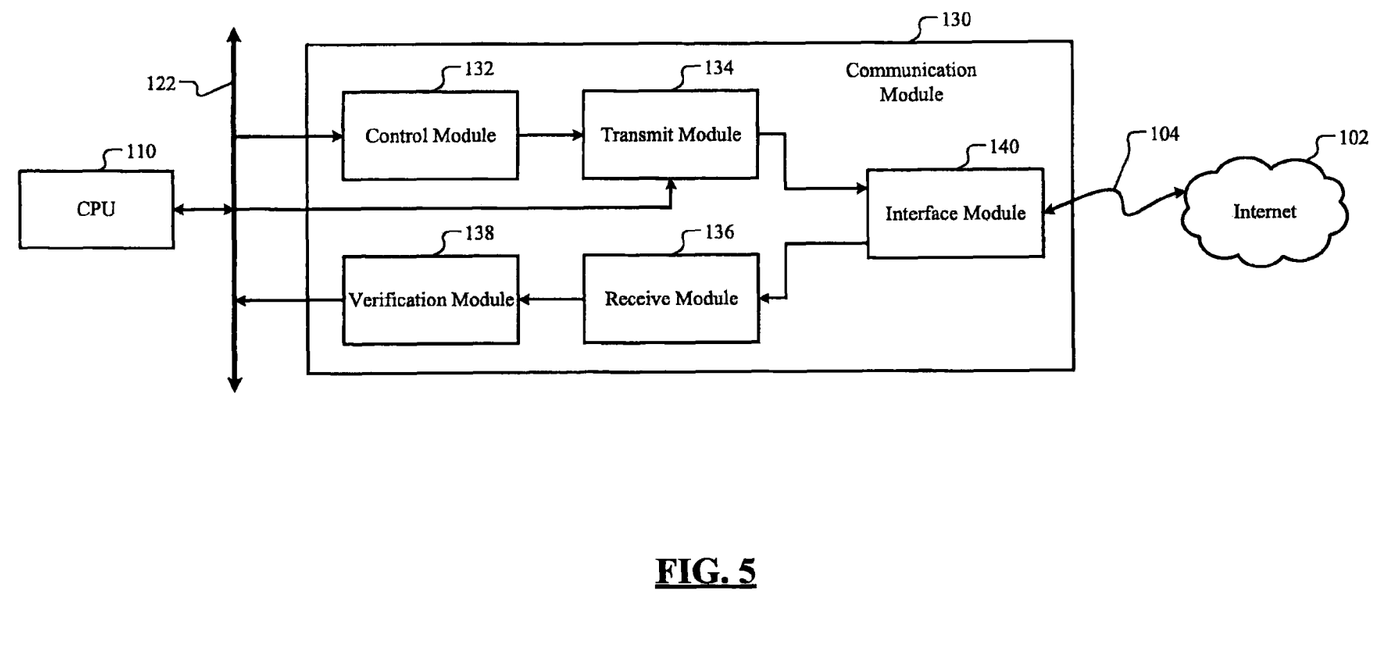
FIG. 5 is a functional block diagram of an example of a communication module of the computing device of FIG. 4.

Referring now to FIG. 5, in an example illustrated embodiment, the communication module 130 may comprise a control module 132, a transmit module 134, a receive module 136, a verification module 138, and an interface module 140. The interface module 140 interfaces the computing device 100 shown in FIGS. 3 and 4 to the Internet 102. The interface module 140 may include a wireline Ethernet interface or a wireless Ethernet interface. The interface module 140 has the Ethernet address that is embedded in the interface module 140 when the communication module 130 is manufactured. The Ethernet address of the interface module 140 is the Ethernet address of the communication module 130. The interface module 140 transmits data from the computing device 100 to Internet 102. The interface module 140 receives data transmitted to the computing device 100 from the Internet 102.

The transmit module 134 receives data to be transmitted from the CPU 110, memory 112, the peripheral control module 114, and/or the I/O control module 118 via the bus 122. For example, the application programs executed by the CPU 110 may generate the data. The application programs may include an e-mail client. The e-mail client may transmit data included in an e-mail to the transmit module 134 via the bus 122. The e-mail may include one or more attachments. The attachments may be stored on one or more of the peripheral devices 116. The attachments may be retrieved from the peripheral devices 116 and output to the transmit module 134 via the bus 122 by the peripheral control module 114 under the control of the e-mail client. The user of the computing device 100 may use one of the I/O devices 120 to enter a send command to send the e-mail. The I/O control module 118 may output the send command to the control module 132 via the bus 122.

Referring again to FIG. 5, the application programs may also include a web page hosting program. The web page hosting program may be invoked by a request received from the Internet 102 to transmit a web page hosted by the computing device 100. The web page hosting program may be executed by the CPU 110. The data related to the web page may be stored on one or more of the peripheral devices 116. The data related to the web page may be retrieved from the peripheral devices 116 and output to the transmit module 134 via the bus 122 by the peripheral control module 114 under the control of the web page hosting program. The web page hosting program may output a transmit command to transmit the web page. The control module 132 may receive the transmit command via the bus 122.

Additionally, the user of the computing device 100 may use one of the I/O devices 120 to invoke an FTP program to upload a file or files to the Internet 102. The FTP program may be executed by the CPU 110. The file or files to be uploaded may be stored in one or more of the peripheral devices 116. The file or files to be uploaded may be retrieved from the peripheral devices 116 and output to the transmit module 134 via the bus 122 by the peripheral control module 114 under the control of the FTP program. The FTP program may output a transmit command to transmit the file or files to be uploaded. The control module 132 may receive the transmit command via the bus 122.

When the control module 132 receives the transmit command to transmit the data received by the transmit module 134 via the bus 122, the control module 132 retrieves the Ethernet address from the interface module 140. The control module 132 outputs the Ethernet address of the interface module 140 to the transmit module 134. The transmit module 134 generates packets of the data received via the bus 122. The transmit module 134 generates headers that precede the packets. The transmit module 134 adds the Ethernet address of the interface module 140 to the headers.

For example, the transmit module 134 may add the Ethernet address to the header of the e-mail data to be transmitted. The transmit module 134 may add the Ethernet address to the header of the web page to be transmitted. The transmit module 134 may add the Ethernet address to the header of the file to be uploaded using FTP.

The transmit module 134 transmits the packets and the headers including the Ethernet address to the Internet 102 via the interface module 140. For example, the transmit module 134 may transmit the packets and headers comprising the e-mail data and the Ethernet address. The transmit module 134 may transmit the packets and headers comprising the web page data and the Ethernet address. The transmit module 134 may transmit the packets and headers comprising the file being uploaded and the Ethernet address. The transmit module 134 outputs the packets and the headers including the Ethernet address to the interface module 140. The interface module 140 transmits the packets and the headers including the Ethernet address to the Internet 102.

The receive module 136 receives data from the Internet 102 via the interface module 140. For example, the receive module 136 may receive e-mails. Additionally, the receive module 136 may receive requests for transmitting the web page hosted by the computing device 100. The receive module 136 may receive files downloaded by the user of the computing device 100 using the FTP program. Additionally, the receive module 138 may receive data downloaded by the user from websites via the Internet 102.

In an example of the embodiment, the verification module 138 can verify if the received data includes an Ethernet address of the sending device and/or the Ethernet address of the interface module 140. When the received data includes the Ethernet address of the sending device, the verification module 140 determines based on the Ethernet address that the sending device transmitted the received data. The verification module 138 can output the received data to one or more modules of the computing device 100 via the bus 122 for further processing when the received data includes the Ethernet address of the sending device and/or the Ethernet address of the interface module 140. The verification module 138 discards the received data when the received data does not include the Ethernet address of the sending device and/or the Ethernet address of the interface module 140.

Alternatively or additionally, the verification module 138 can verify if the source MAC address from the NIC (i.e., the Ethernet address of the NIC of the sending device) in the received data matches the source MAC address from the OS (i.e., the Ethernet address input by the OS). The verification module 138 can output the received data to one or more modules of the computing device 100 via the bus 122 for further processing when the source MAC address from the NIC in the received data matches the source MAC address from the OS. The verification module 138 discards the received data when the source MAC address from the NIC in the received data does not match the source MAC address from the OS. Further, when the source MAC address from the NIC in the received data does not match the source MAC address from the OS, the verification module 140 determines based on the source MAC address from the NIC that the sending device transmitted the received data.

When data is transmitted and received according to the teachings of the present disclosure, problems at the receiver may be prevented or reduced due to the verification of the Ethernet address performed at the receiver. Additionally, when the received data causes any problems, the sending device that sends the problematic data can be tracked and identified based on the Ethernet address of the sending device included in the received data. Moreover, the possibility of identification may deter wrongdoers from transmitting problematic data. For example, the possibility of identification may deter wrongdoers from transmitting data that includes spam and/or viruses and data that is intended to commit fraud and/or hacking. Additionally, in jurisdictions where laws forbid gambling, hosting offensive content, and infringing copyrights and trademarks on the Internet, the possibility of identification may deter wrongdoers from transmitting data that is forbidden by the laws of the jurisdictions.

Referring now to FIG. 6, an example of a method 200 for tracking sources of data transmitted over the Internet is shown. Control begins in step 202. Control determines in step 204 whether data is to be transmitted from a computing device to the Internet or data is being received by the computing device from the Internet. Data to be transmitted may include e-mails, web pages hosted by the computing device, and/or files to be uploaded from the computing device to the Internet via FTP. Data being received may include e-mails, web pages hosted by other computing devices on the Internet, and/or files being downloaded from the other computing devices via FTP.

When data is to be transmitted to the Internet, control receives data to be transmitted in step 206. Control determines in step 208 whether the command to transmit the data is received. When the result of step 208 is false (i.e., when the command to transmit the data is not yet received), control waits until the command to transmit the data is received. When the result of step 208 is true (i.e., when the command to transmit the data is received), in step 210, control adds the Ethernet address of an interface module of the computing device (e.g., the Ethernet address of a NIC card) to the data to be transmitted. Control transmits the data including the Ethernet address over the Internet in step 212.

On the other hand, when data is received from the Internet, control verifies in step 214 whether the received data includes the Ethernet address of the sending device and/or the Ethernet address of the interface module of the computing device. When the result of step 214 is true (i.e., when the received data includes the Ethernet address of the sending device and/or the Ethernet address of the interface module of the computing device), control determines in step 215 if the Ethernet addresses from the NIC and OS match in the received data. When the result of step 215 is true (i.e., when the Ethernet addresses from the NIC and OS match in the received data), control accepts the received data in step 216. Subsequently, control forwards the received data to one or more modules of the computing device via a bus, for example, for further processing. In step 218, control determines based on the Ethernet address that the sending device transmitted the received data.

When, however, the result of step 214 is false (i.e., when the received data does not include the Ethernet address of the sending device and/or the Ethernet address of the interface module of the computing device), control discards the received data in step 220. Additionally, when the result of step 215 is false (i.e., when the Ethernet addresses from the NIC and OS do not match in the received data), control discards the received data in step 220. Control performs step 218 at the end of step 220. Control returns to step 204 at the end of steps 212 and 218.

The art relating to the present disclosure has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present.

For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, the various aspects and embodiments are for purposes of illustration and are not intended to be limiting, with the true scope and spirit being indicated by the following claims.

The invention claimed is:

1. A communication module, comprising:
   a transmit module that receives first data for transmitting said first data over a network from one of plural modules corresponding to a computing device that includes the communication module;
   a network interface card (NIC), corresponding to the computing device that includes the communication module, to interface said transmit module to said network and that has a network address embedded therein to identify said NIC on said network; and
   a control module that receives a control signal, to transmit said first data over said network, from one of the plural modules corresponding to the computing device that includes the communication module and that outputs said network address to said transmit module when said control signal is received,
      wherein said transmit module transmits said first data that includes said network address, output from said control module, over said network.

2. The communication module of claim 1 wherein said network includes the Internet, said network address includes an Ethernet address, and said control signal includes a transmit command to transmit said first data.

3. The communication module of claim 1 wherein said first data includes at least one of an electronic mail, a web page, and a file that is uploaded to said network using file transfer protocol (FTP).

4. The communication module of claim 1 wherein said NIC comprises one of a wireline Ethernet interface and a wireless Ethernet interface.

5. A network interface card (NIC) comprising the communication module of claim 1 wherein said network address identifies said NIC on said network.

6. The computing device comprising the communication module of claim 1, wherein said first data includes at least one of an electronic mail sent by the computing device, a web page hosted by the computing device, and a file uploaded from the computing device using a file transfer protocol (FTP).

7. The communication module of claim 1 further comprising:
   a receive module that receives second data from a remote computing device via said network; and
   a verification module that verifies whether said second data includes at least one of said network address and another network address that identifies said remote computing device on said network.

8. The communication module of claim 7 wherein said verification module discards said second data when said second data does not include at least one of said network address and said other network address.

9. The communication module of claim 7 wherein said second data includes at least one of an electronic mail transmitted by said remote computing device, a web page hosted by said remote computing device, and a file uploaded by said remote computing device using a file transfer protocol (FTP).

10. The communication module of claim 1 further comprising:
    a receive module that receives second data from a remote computing device via said network; and
    a verification module that verifies whether said second data includes a second network address that identifies said remote computing device on said network and whether said second network address matches a third network address input in said second data by an operating system of said remote computing device.

11. The communication module of claim 10 wherein when said second data includes said second network address, said verification module determines based on said second network address that said remote computing device transmitted said second data.

12. A method, comprising:
    transmitting data over a network via a transmit module corresponding to a computing device;
    interfacing said transmit module to said network using a network interface card (NIC) corresponding to the computing device having a network address embedded therein that identifies said NIC on said network;
    receiving first data for transmitting said first data over said network from one of plural modules corresponding to the computing device;
    receiving a control signal to transmit said first data over said network from one of the plural modules corresponding to the computing device;
    including said network address in said first data when said control signal is received; and
    transmitting said first data that includes said network address over said network.

13. The method of claim 12 further comprising interfacing said transmit module to said network using one of a wireline Ethernet interface and a wireless Ethernet interface.

14. The method of claim 12 further comprising:
    receiving second data from a remote computing device via said network; and verifying whether said second data includes at least one of said network address and another network address that identifies said remote computing device on said network.

15. The method of claim 14 further comprising determining that said remote computing device transmitted said second data when said second data includes said other network address.

16. The method of claim 14 further comprising discarding said second data when said second data does not include at least one of said network address and said other network address.

17. The method of claim 12 further comprising:
receiving second data from a remote computing device via said network;
verifying whether said second data includes a second network address that identifies said remote computing device on said network; and
verifying whether said second network address matches a third network address input in said second data by an operating system of said remote computing device.

18. The method of claim 17 further comprising determining based on said second network address that said remote computing device transmitted said second data when said second data includes said second network address.

19. The method of claim 17 further comprising discarding said second data when said second network address does not match said third network address.

20. A system, comprising:
a transmit module that receives first data for transmitting said first data over a network;
a computing device selected from a group consisting of a personal computer (PC), a laptop computer, a cellular phone, and a mobile computing device;
a network interface card (NIC) that interfaces said transmit module to said network and that has a network address embedded therein that identifies said NIC on said network;
a verification module that verifies whether said first data includes at least one of said network address and another network address that identifies said remote computing device on said network;
a receive module that receives second data from a remote computing device via said network; and
a control module that receives a control signal to transmit said first data over said network and that outputs said network address to said transmit module when said control signal is received,
wherein said transmit module transmits said first data that includes said network address over said network, and wherein when said second data includes said other network address, said verification module determines based on said other network address that said remote computing device transmitted said second data, said second data includes at least one of an electronic mail transmitted by said remote computing device, a web page hosted by said remote computing device, and a file uploaded by said remote computing device using a file transfer protocol (FTP).

* * * * *